US012558889B2

(12) United States Patent
Hirabayashi et al.

(10) Patent No.: US 12,558,889 B2
(45) Date of Patent: Feb. 24, 2026

(54) LIQUID DISCHARGE HEAD, HEAD MODULE, HEAD UNIT, AND LIQUID DISCHARGE APPARATUS

(71) Applicants: Takuma Hirabayashi, Tokyo (JP); Toshiaki Masuda, Kanagawa (JP)

(72) Inventors: Takuma Hirabayashi, Tokyo (JP); Toshiaki Masuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 154 days.

(21) Appl. No.: 18/389,239

(22) Filed: Nov. 14, 2023

(65) Prior Publication Data

US 2024/0157698 A1 May 16, 2024

(30) Foreign Application Priority Data

Nov. 14, 2022 (JP) ................................ 2022-181725

(51) Int. Cl.
*B41J 2/055* (2006.01)
*B41J 2/14* (2006.01)

(52) U.S. Cl.
CPC ........... *B41J 2/055* (2013.01); *B41J 2/14233* (2013.01)

(58) Field of Classification Search
CPC ........ B41J 2/055; B41J 2/14233; B41J 2/175; B41J 2002/14362; B41J 2202/08; B41J 2202/12; B41J 2002/14419; B41J 2202/20
See application file for complete search history.

(56) References Cited

U.S. PATENT DOCUMENTS

| | | | |
|---|---|---|---|
| 5,793,073 | A | 8/1998 | Kaminishi et al. |
| 2017/0253040 | A1 | 9/2017 | Shinkai et al. |
| 2017/0306471 | A1 | 10/2017 | Abe et al. |
| 2018/0117915 | A1 | 5/2018 | Takeuchi et al. |
| 2018/0370237 | A1 | 12/2018 | Mizukami et al. |

(Continued)

FOREIGN PATENT DOCUMENTS

| | | | |
|---|---|---|---|
| JP | 8-233765 A | | 9/1996 |
| JP | 2015116769 A | * | 6/2015 |

OTHER PUBLICATIONS

Takahashi Ayaki, "Liquid Droplet Discharge Head, Liquid Droplet Discharge Device and Image Formation Device" (JP 2015116769 A), Jun. 25, 2015, [Description of Embodiments, Ejection Head, Holding Substrate, and First Embodiment] (Year: 2015).*

*Primary Examiner* — Lisa Solomon
(74) *Attorney, Agent, or Firm* — XSENSUS LLP

(57) ABSTRACT

A liquid discharge head includes: a nozzle through which a liquid is to be discharged; an individual chamber in communication with the nozzle; a pressure generator to generate pressure in the individual chamber; and a damper member including: a damper having flexibility; and a damper frame supporting the damper, the damper frame having: a damper region having a cavity facing the damper; a through hole at one side of the damper region in a longitudinal direction of the damper member; a first communication path connecting the through hole and one circumferential end of the damper member in the longitudinal direction; and a second communication path connecting the through hole and one side of the cavity of the damper region in the longitudinal direction, the second communication path is shifted from the first communication path in a transverse direction orthogonal to the longitudinal direction.

19 Claims, 11 Drawing Sheets

(56) References Cited

U.S. PATENT DOCUMENTS

| | | | |
|---|---|---|---|
| 2019/0044055 | A1 | 2/2019 | Kondo et al. |
| 2019/0270310 | A1 | 9/2019 | Masuda et al. |
| 2020/0031113 | A1 | 1/2020 | Kondo et al. |
| 2020/0298570 | A1 | 9/2020 | Masuda et al. |
| 2021/0039393 | A1 | 2/2021 | Mizukami et al. |
| 2021/0162759 | A1 | 6/2021 | Miwa et al. |
| 2022/0097373 | A1 | 3/2022 | Masuda |
| 2022/0242123 | A1 | 8/2022 | Hirabayashi et al. |
| 2023/0021821 | A1 | 1/2023 | Kuroda et al. |
| 2023/0108462 | A1 | 4/2023 | Masuda et al. |
| 2023/0135522 | A1 | 5/2023 | Watanabe et al. |
| 2023/0141751 | A1 | 5/2023 | Sugioka et al. |
| 2023/0157177 | A1 | 5/2023 | Hirabayashi et al. |
| 2023/0278337 | A1 | 9/2023 | Hirabayashi et al. |
| 2023/0294403 | A1 | 9/2023 | Nagahashi et al. |

* cited by examiner

LIQUID DISCHARGE HEAD, HEAD MODULE, HEAD UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-181725, filed on Nov. 14, 2022, in the Japan Patent Office, the entire disclosure of which is hereby incorporated by reference herein.

BACKGROUND

Technical Field

The present embodiment relates to a liquid discharge head, a head module, a head unit, and a liquid discharge apparatus.

Related Art

A liquid discharge head that deforms a piezoelectric body to discharge ink as liquid is provided with a damper member that absorbs vibrations due to the propagation of vibrations to a liquid chamber to which the piezoelectric body is adjacent or due to a variation in the flow rate of ink at the time of deformation of the piezoelectric body.

A cavity at which the damper member vibrates is provided as an enclosed space, and a communication path or a communication hole for releasing the internal pressure of the cavity is provided in the cavity.

For example, provided is a communication-path formation member having a communication path having an end in communication with a damper chamber and the other end in communication with an atmosphere communication hole.

However, provision of a communication path or a communication hole in communication with the side of location of the atmosphere into the damper member causes a deterioration in the strength of the damper member, leading to easy damage.

SUMMARY

In an aspect of the present disclosure, a liquid discharge head includes: a nozzle through which a liquid is to be discharged; an individual chamber in communication with the nozzle; a pressure generator to generate pressure in the individual chamber; and a damper member including: a damper having flexibility; and a damper frame supporting the damper, the damper frame having: a damper region having a cavity facing the damper; a through hole at one side of the damper region in a longitudinal direction of the damper member; a first communication path connecting the through hole and one circumferential end of the damper member in the longitudinal direction; and a second communication path connecting the through hole and one side the cavity of the damper region in the longitudinal direction, the second communication path is shifted from the first communication path in a transverse direction orthogonal to the longitudinal direction.

In another aspect of the present disclosure, a liquid discharge head includes: a nozzle through which a liquid is to be discharged; an individual chamber in communication with the nozzle; a pressure generator to generate pressure in the individual chamber; and a damper member including: a damper having flexibility; and a damper frame supporting the damper, the damper frame having: a damper region having multiple cavities facing the damper; a through hole at one side of the damper region in a longitudinal direction of the damper member; a first communication path connecting the through hole and one circumferential end of the damper member in the longitudinal direction; a second communication path connecting the through hole and one side of the multiple cavities of the damper region in the longitudinal direction; and a third communication path serially connecting each of the multiple cavities in the longitudinal direction, the third communication path is shifted from the first communication path in a transverse direction orthogonal to the longitudinal direction.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
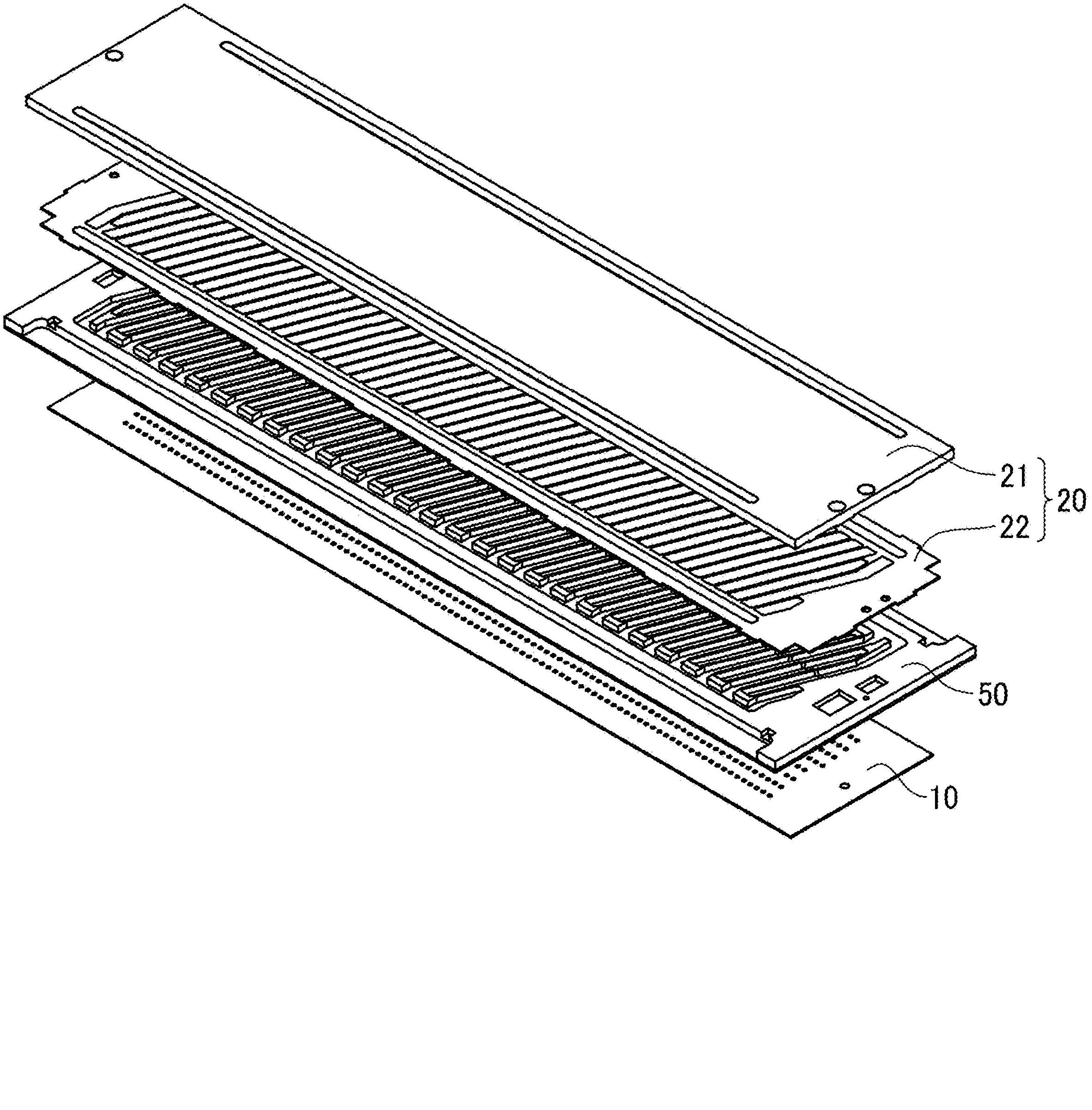
FIG. 1 is an exploded perspective view of a layered structure including a damper member in a liquid discharge head.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present embodiment will be described below with reference to the drawings. Note that the same parts or equivalent parts are denoted with the same reference signs and thus duplicate descriptions of the same parts or equivalent parts will be appropriately simplified or omitted.

FIG. 1 is a perspective view of a layered structure in a liquid discharge head. The liquid discharge head includes a nozzle plate 10, a supporting substrate 50 supporting a piezoelectric element, and a damper member 20 stacked one on another inside.

The damper member 20 includes a damper frame 21 and a damper 22 having flexibility, in which the damper frame 21 serves as a support that supports the damper 22. The damper 22 is shaped like a thin film and covers the entire face on the side of location of the nozzle plate 10 of the damper frame 21. The damper frame 21 and the damper 22 are each made of a Si-based material containing Si. For the damper frame 21 and the damper 22 in the present embodiment, a cutout from a silicon wafer is processed as an integrated formation of the damper frame 21 and the damper 22. Then, the integrated formation is separated into the damper frame 21 and the damper 22, followed by mutual bonding.

Figure 2:
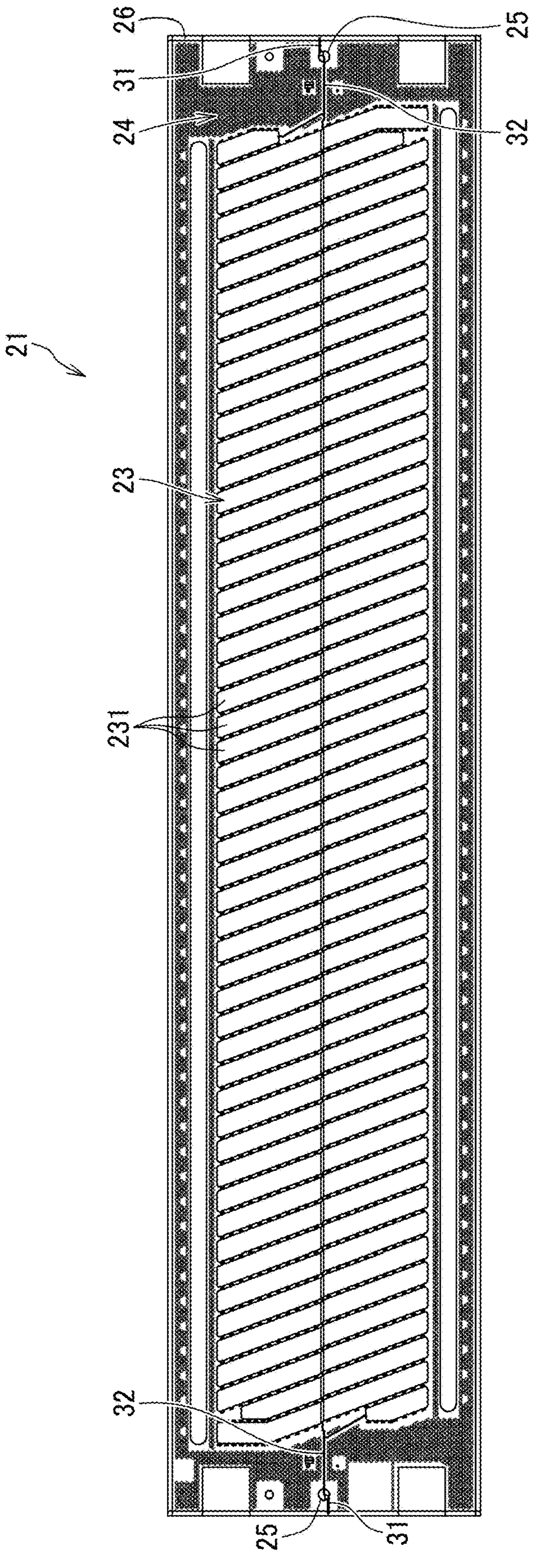
FIG. 2 is a bottom view of a damper frame.
Figure 3:
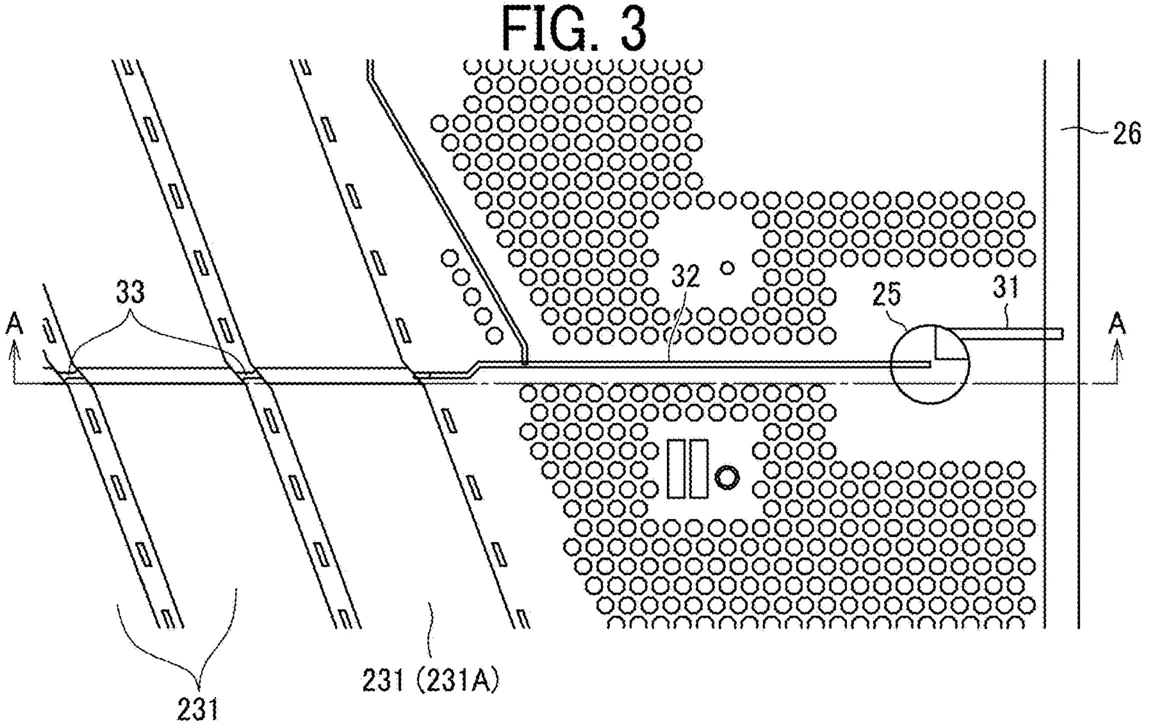
FIG. 3 is an enlarged view of a portion around a through hole in FIG. 2.
Figure 4:
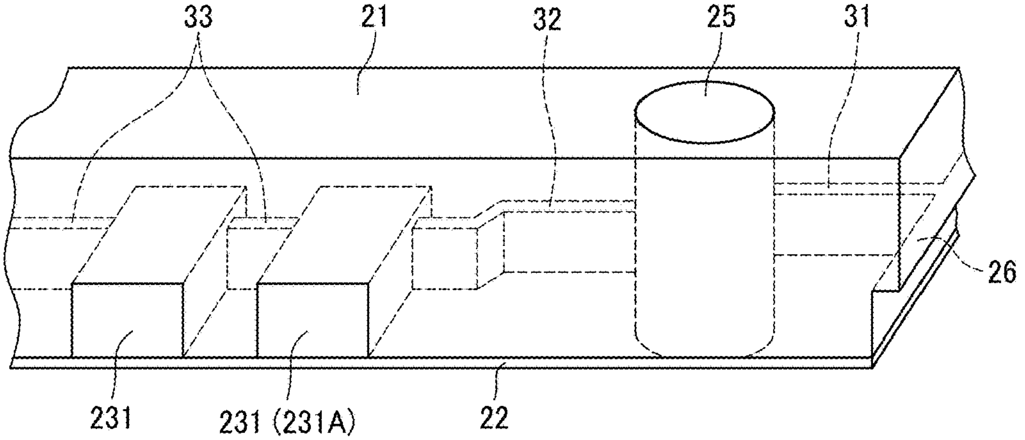
FIG. 4 is a perspective view of the damper frame and a damper.
Figure 5:
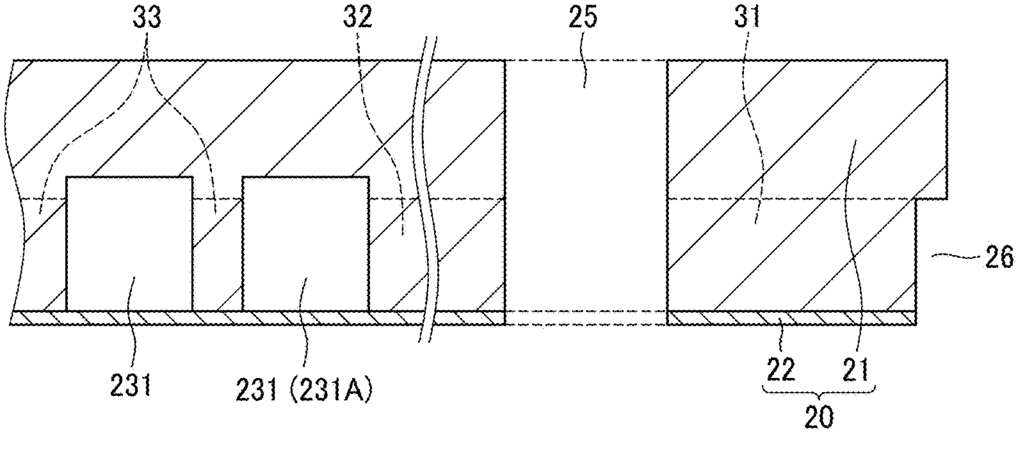
FIG. 5 is a cross-sectional view taken along line A-A of FIG. 3.

A more detailed configuration of the damper member will be described below with FIGS. 2 to 5. FIG. 2 is a bottom view of the damper frame 21 from the side of location of the nozzle plate 10. FIG. 3 is an enlarged view of an extracted portion around a through hole in FIG. 2. FIG. 4 is a perspective view of the damper frame 21 and the damper 22 in the portion of FIG. 3. FIG. 5 is a cross-sectional view taken along line A-A line of FIG. 3.

The up-down direction of FIG. 2 corresponds to the longitudinal direction of the damper member 20, the damper frame 21, and the damper 22. The left-right direction of FIG. 2 corresponds to the lateral direction of the damper member 20, the damper frame 21, and the damper 22. The direction orthogonal to the drawing plane of FIG. 2 corresponds to the thickness direction of the damper member 20, the damper frame 21, and the damper 22. Hereinafter, such directions are also simply referred to as the longitudinal, lateral, and thickness directions.

As illustrated in FIG. 2, the damper member 20 has a damper region 23 at its center side. In the damper region 23, a plurality of cavities 231 each serving as a damper chamber is disposed side by side in the longitudinal direction.

The damper member 20 has, outside the damper region 23, a damper outer region 24 for the outer circumferential side portion of the damper member 20. The damper outer region 24 is provided with through holes 25 penetrating in the thickness direction corresponding to the direction orthogonal to the drawing plane of FIG. 2 and dicing lines 26 each as an outer circumferential end of the damper frame 21. Such an outer circumferential end of the damper frame 21 corresponds to a cut face of a chip cut from a wafer for formation of the damper frame 21. In particular, the damper frame 21 in the present embodiment has one side and the other side substantially symmetrical with respect to the center in the longitudinal direction. The white part of the damper frame 21 in FIG. 2 is filled with silicon. The cavities 231 and communication paths to be described later are each provided as a space on the side of location of the damper 22 in the thickness direction.

As illustrated in FIG. 3, a third communication path 33 is provided between each cavity 231 such that the cavities 231 are in communication with each other in the longitudinal direction. A cavity 231A as a cavity 231 outermost in the longitudinal direction of the damper region 23 is in communication with a through hole 25 through a second communication path 32. The through hole 25 is in communication with a dicing line 26 through a first communication path 31. As illustrated in FIG. 2, such through holes 25 are provided one-to-one on both sides in the longitudinal direction of the damper outer region 24. Each through hole 25 is in communication with the corresponding dicing line 26 through the corresponding first communication path 31 and is in communication with each cavity 231 through the corresponding second communication path 32.

As illustrated in FIGS. 4 and 5, each cavity 231 is a space between the upper portion of the damper frame 21 and the damper 22. The cavities 231 are each an enclosed space except for being in communication with the outside of the cavity 231 through the third communication path 33 or the second communication path 32. The through hole 25 is in communication with the outside of the damper member 20 on each side in the thickness direction of the through hole 25. The first communication path 31 is in communication with the outside of the damper member 20 through the dicing line 26. The third communication path 33 serves as a communication path through which cavities 231 are in communication with each other, whereas the first communication path 31 and the second communication path 32 each serve as a communication path through which a cavity 231 is in communication with the outside of the damper member 20. The second communication path 32 may be in indirect communication with the cavity 231 or the through hole 25 through a different communication path.

Ink is supplied from a common liquid chamber to an individual chamber and then a piezoelectric element pressurizes the individual chamber, so that the ink is discharged through a nozzle. In this case, a membrane that is part of the damper 22 and faces a cavity 231 vibrates to absorb a variation in pressure. Then, since the cavity 231 is in communication with the through hole 25 through the third communication path 33 and the second communication path 32 and the through hole 25 is in communication with the dicing line 26 through the first communication path 31, the internal pressure of the cavity 231 can be released outward from the damper member 20.

Figure 6:
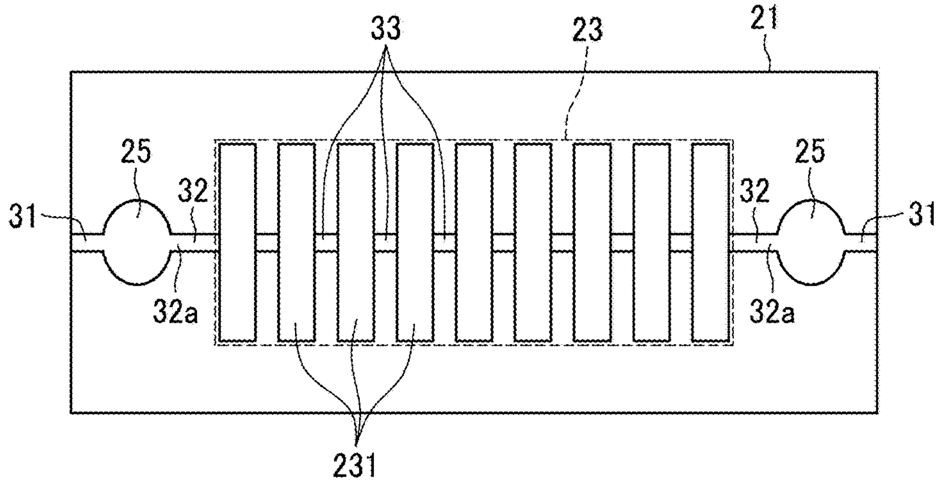
FIG. 6 illustrates the arrangement of communication paths different from any arrangement of communication paths according to the present embodiment.

Depending on the arrangement of the first communication path 31 to the third communication path 33, a deterioration may occur in the strength of the damper frame 21. For example, as illustrated in FIG. 6, communication paths including a first communication path 31 and a second communication path 32 on one side, third communication paths 33, and a second communication path 32 and a first communication path 31 on the other side are disposed on a straight line. According to such a configuration in which communication paths that are parts low in strength are disposed in a straight line, the part at which the communication paths are disposed in the damper frame 21 is low in strength. That is, during a wafer process or during assembly, such as dicing or taping, as a disadvantage, the part at which the first communication path 31 to the third communication path 33 are disposed in the damper frame 21 tends to be damaged by external force, such as occurrence of a crack in the damper frame 21 based on the first communication path 31 to the third communication path 33. Note that, because the cavities and third communication paths 33 in FIG. 6 are illustrated large in width for convenience, the numbers of cavities and third communication paths 33 in FIG. 6 are different from the numbers of cavities and third communication paths 33 in practice.

Figure 7:
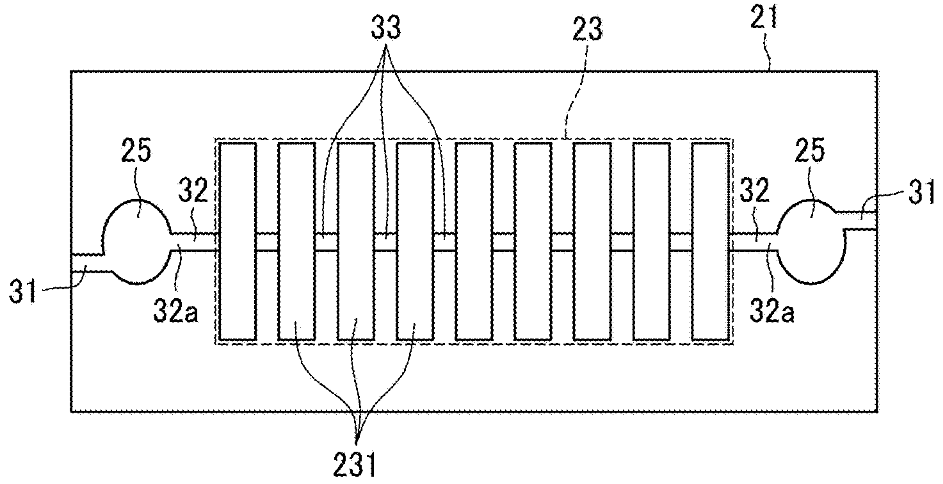
FIG. 7 illustrates the arrangement of communication paths according to an embodiment of the present embodiment.

In contrast to this, in the present embodiment, as illustrated in FIG. 7, provided is a configuration in which the straight line on which the first communication path 31 on one side is disposed and the straight line on which the first communication path 31 on the other side is disposed are not identical. Thus, a deterioration in the strength of the damper frame 21 due to arrangement of communication paths can be inhibited. Therefore, the damper frame 21 can be prevented from cracking based on the communication paths, that is, an improvement can be made in the strength of the damper frame 21 or in the strength of the damper member 20. Thus, provided can be a structure in which the damper member 20 is hardly damaged. The description "the straight line on which the first communication path 31 on one side is disposed and the straight line on which the first communication path 31 on the other side is disposed are not identical" indicates that, in a case where the first communication path 31 on one side is extended to the side of location of the first communication path 31 on the other side on the plane of FIG. 7 orthogonal to the thickness direction of the damper frame 21, at least part of the first communication path 31 on one side is not disposed on the straight line on which the first communication path 31 on the other side is disposed. In other words, the first communication path 31 on one side and the first communication path 31 on the other side may be disposed such that at least the position of at least part of the first communication path 31 on one side is not identical to the position of at least part of the first communication path 31 on the other side in the lateral direction. That is, the first communication path 31 on one side and the first communication path on the other side may be disposed such that, in a case where the damper frame 21 is folded at the center in the longitudinal direction, the first communication path 31 on one side and the first communication path on the other side do not overlap at least partially.

In the embodiment of FIG. 7, the second communication paths 32 each have a first communication portion **32*a* as a portion in communication with the corresponding through hole 25. The first communication portions 32*a* are disposed out of the straight lines on which the first communication paths 31 are disposed. Thus, an improvement can be made in the strength of the damper member 20**.

Figure 8:
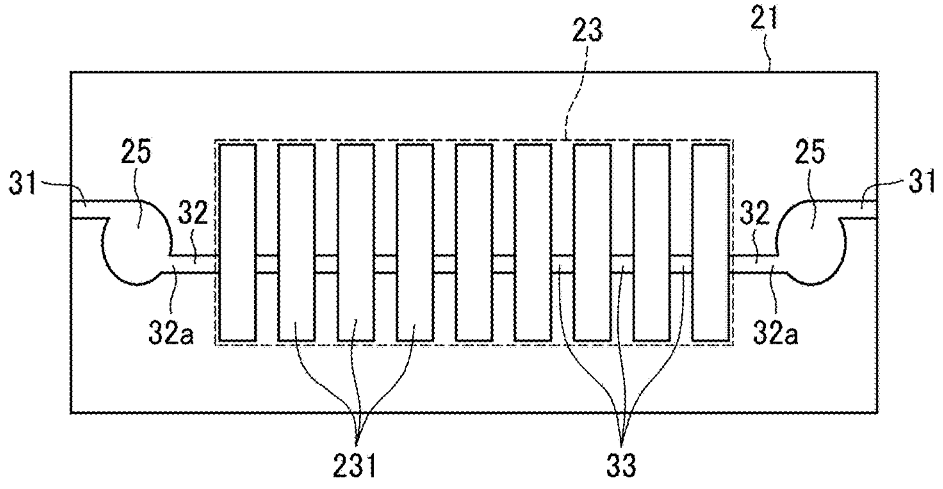
FIG. 8 illustrates the arrangement of communication paths according to an embodiment of the present embodiment.

Like an embodiment illustrated in FIG. 8, provided can be a configuration in which the first communication path 31 on one side and the first communication path 31 on the other side are disposed on a straight line, the second communication paths 32 each have a first communication portion **32*a* as a portion in communication with the corresponding through hole 25, and the first communication portions 32*a* are disposed out of the straight line on which the first communication paths 31 are disposed. In the present embodiment, an improvement can be made in the strength of the damper member 20, in comparison to the configuration of FIG. 6**.

Figure 9:
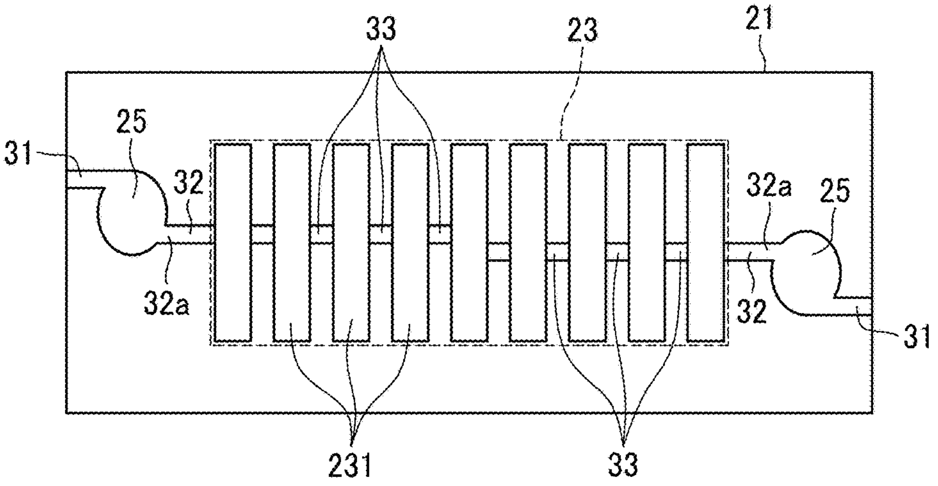
FIG. 9 illustrates the arrangement of communication paths according to an embodiment of the present embodiment.

In an embodiment illustrated in FIG. 9, provided is a configuration in which the straight line on which part of the third communication paths 33 is disposed and the straight line on which the remaining part of the third communication paths 33 is disposed are not identical. Specifically, the straight line on which the third communication paths 33 on one side are disposed and the straight line on which the third communication paths 33 on the other side are disposed are not identical. Thus, an improvement can be made in the strength of the damper member 20. The straight lines on which the third communication paths 33 are disposed are not identical to the straight lines on which the first communication paths 31 are disposed. Thus, an improvement can be made in the strength of the damper member 20.

Figure 10:
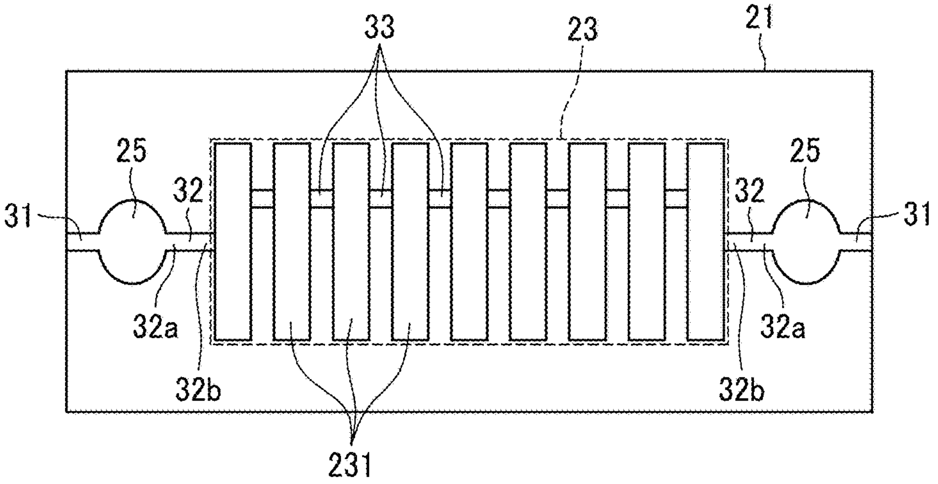
FIG. 10 illustrates the arrangement of communication paths according to an embodiment of the present embodiment.

In an embodiment illustrated in FIG. 10, provided is a configuration in which the second communication paths 32 each have a second communication portion **32*b* in communication with the corresponding cavity 231, and the second communication portions 32*b* are disposed out of the straight line on which the third communication paths 33 are disposed. Thus, an improvement can be made in the strength of the damper member 20**.

Figure 11:
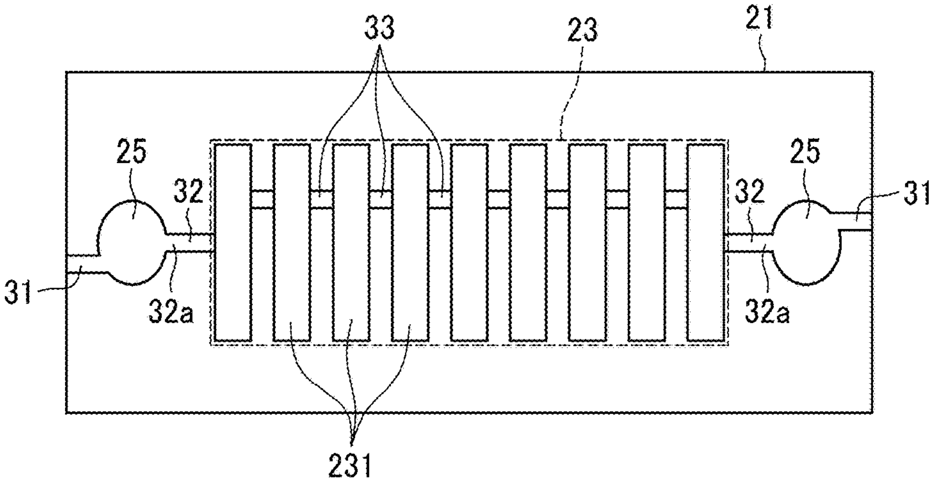
FIG. 11 illustrates the arrangement of communication paths according to an embodiment of the present embodiment.

In an embodiment illustrated in FIG. 11, provided is a configuration in which, in addition to the embodiment of FIG. 10, the straight lines on which the first communication paths 31 are disposed are not identical to the straight lines on which the first communication portions **32*a* of the second communication paths 32 are disposed and the straight line on which the third communication paths 33 are disposed. Due to the first communication paths 31 further shifted in arrangement, a further improvement can be made in the strength of the damper member 20**.

As above, a configuration in which the straight line on which at least part of one of the first communication paths 31 is disposed is not identical to the straight line on which at least part of the other first communication path 31 is disposed, a configuration in which the straight line on which at least part of the third communication paths 33 is disposed is not identical to the straight line on which the remaining part of the third communication paths 33 is disposed, a configuration in which the straight line on which at least part of each first communication path 31 is disposed is not identical to the straight line on which the first communication portion **32*a* of the corresponding second communication path 32 is disposed, or a configuration in which the straight line on which the second communication portion 32*b* of each second communication path 32 is disposed is not identical to the straight line on which at least part of the third communication paths 33 is disposed enables an improvement in the strength of the damper member 20. Any combination of the configurations enables a further improvement in the strength of the damper member 20 with a smaller range of communication paths disposed on a straight line. Note that, for example, in the embodiment of FIG. 7, the straight line on which the entirety of one of the first communication paths 31 is disposed is not identical to the straight line on which the entirety of the other first communication path 31 is disposed. However, provided may be a configuration in which the straight line on which part of one of the first communication paths 31 is disposed is not identical to the straight line on which part of the other first communication path 31** is disposed. The same applies to the other communication paths.

The through holes 25 are provided one-to-one closer to the ends in the longitudinal direction of the damper frame 21. In particular, in the present embodiment, in a case where the damper outer region 24 on one side in the longitudinal direction with respect to the damper region 23 is halved in the longitudinal direction, the through hole 25 on the one side in the longitudinal direction is located in the halved region on the one side in the longitudinal direction.

In a case where the damper outer region 24 on the other side in the longitudinal direction with respect to the damper region 23 is halved in the longitudinal direction, the through hole 25 on the other side in the longitudinal direction is located in the halved region on the other side in the longitudinal direction. Thus, an improvement can be made in the accuracy of alignment of the damper frame 21. Since the through holes 25 are disposed on both sides in the longitudinal direction, the internal air of each cavity 231 can be released outward from either side in the longitudinal direction. Thus, the internal air of each cavity 231 can be easily released outward. Thus, the cavities 231 can be equalized in air resistance with a further reduction in the internal air resistance of each cavity 231.

Figure 12:
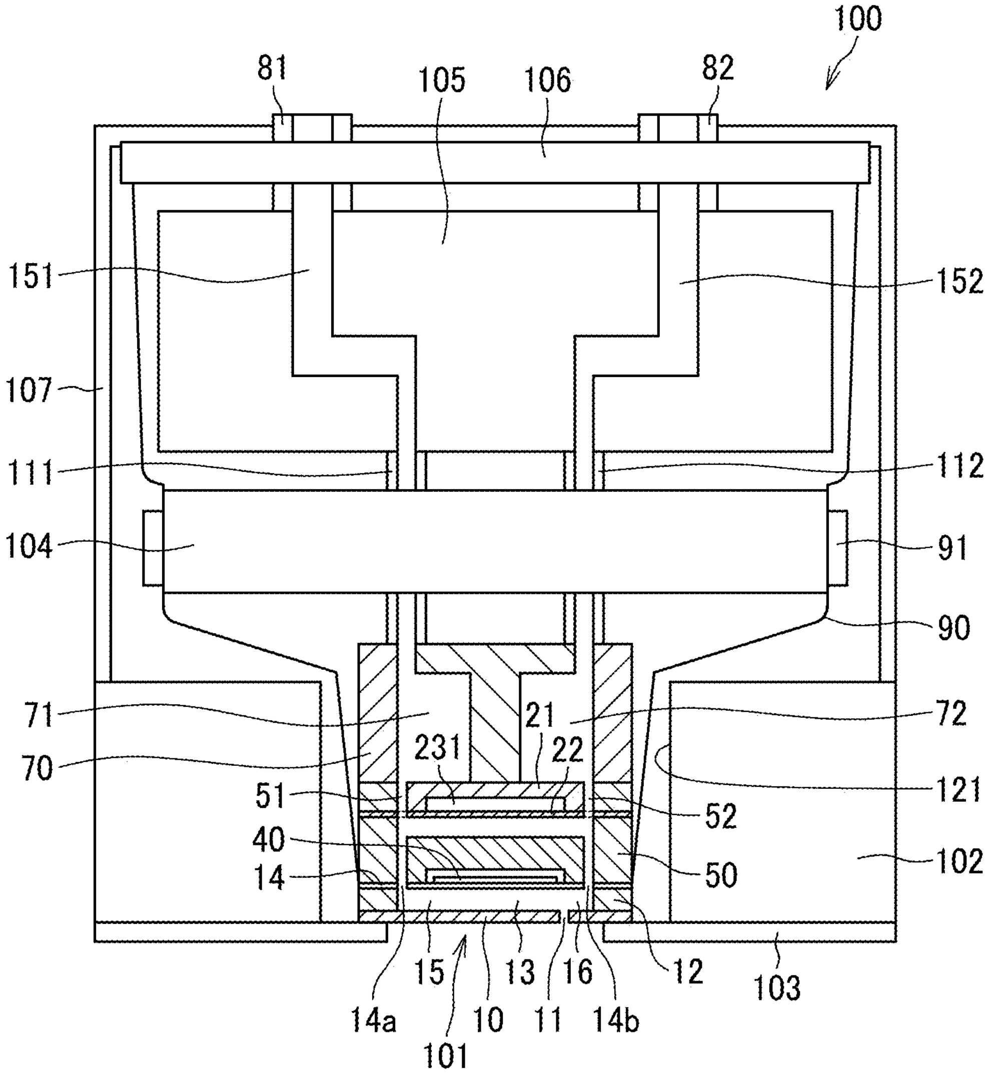
FIG. 12 is a cross-sectional view of a head module along a head lateral direction.
Figure 13:
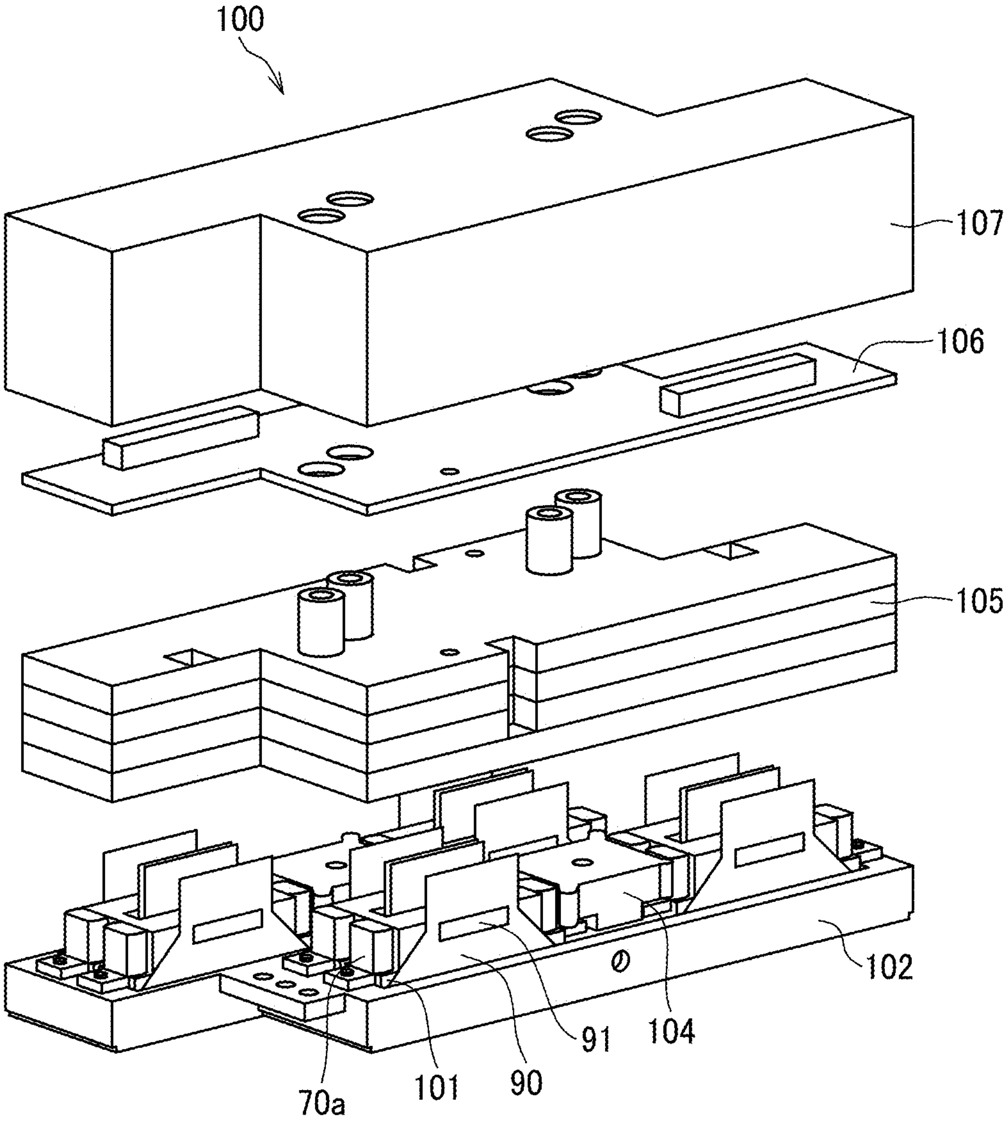
FIG. 13 is an exploded perspective view of the head module.
Figure 14:
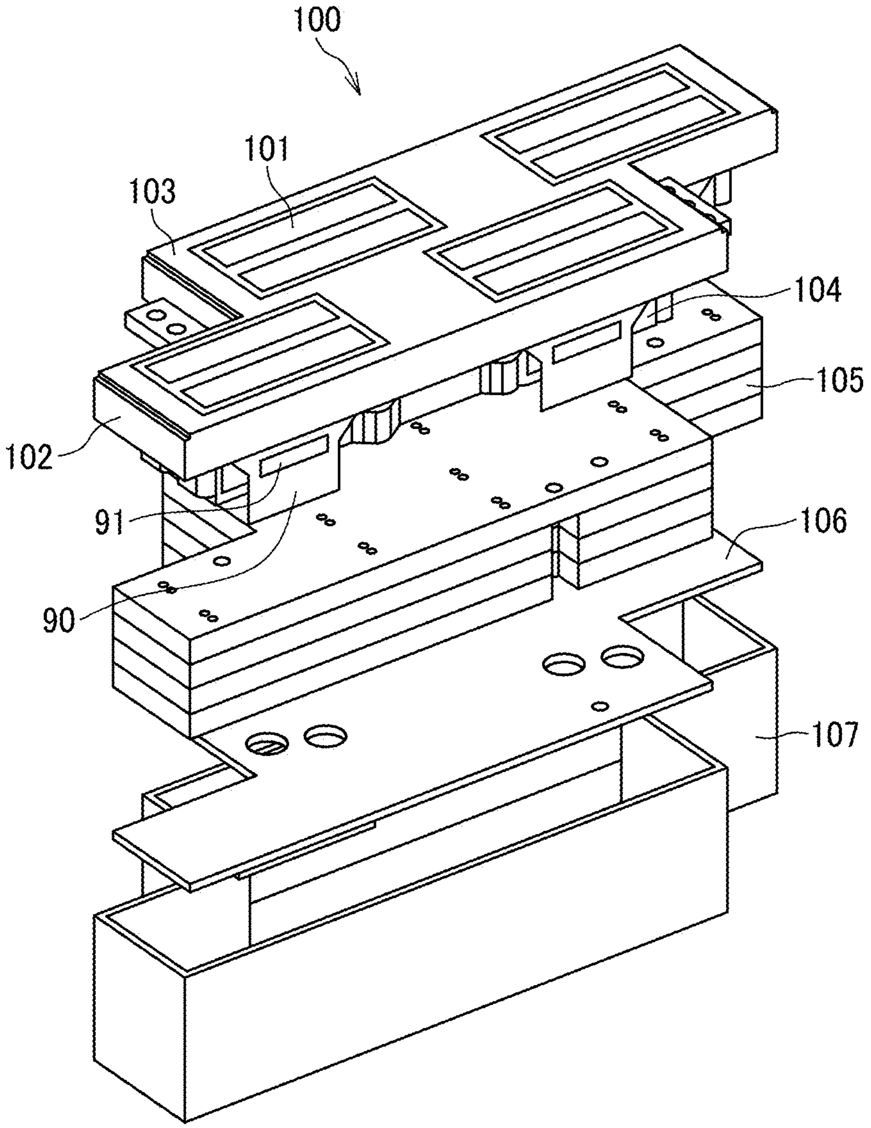
FIG. 14 is an exploded perspective view of the head module from the side of location of a nozzle face.
Figure 15:
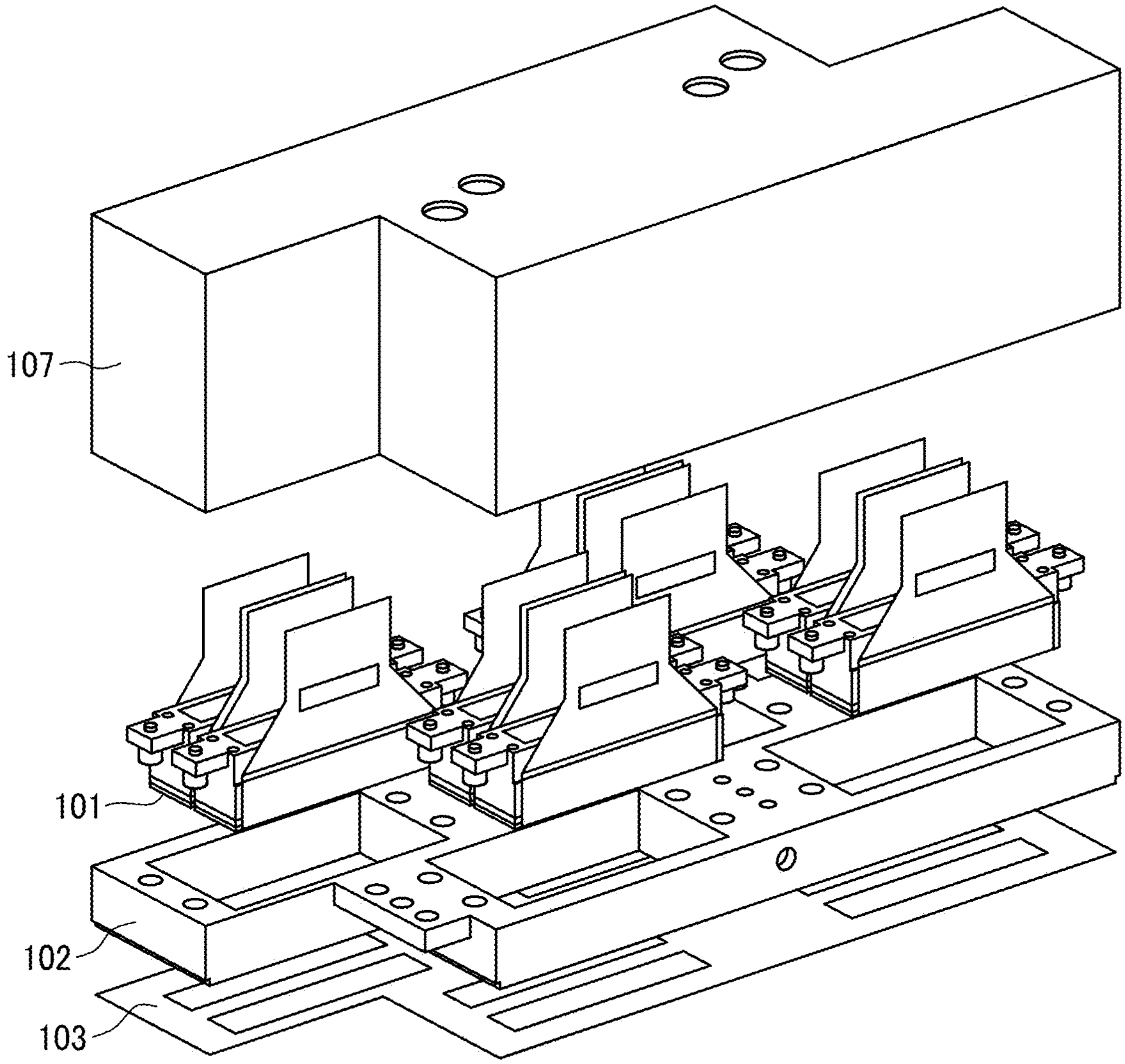
FIG. 15 is an exploded perspective view of the head module including a head, a base, and a cover.

Next, a head module including a liquid discharge head including the damper member described above will be described with reference to FIGS. 12 to 15. FIG. 12 is an explanatory cross-sectional view of a head module, along a head lateral direction, according to an embodiment. FIG. 13 is an explanatory exploded perspective view of the head module. FIG. 14 is an explanatory exploded perspective view of the head module from the side of location of a nozzle face. FIG. 15 is an explanatory exploded perspective view of the head module including a head, a base, and a cover. Note that FIG. 12 schematically illustrates the internal structure of the head module, in which some members have been changed in scale and the configuration has been partially simplified for convenience.

A head module 100 includes a plurality of liquid discharge heads 101 that each discharges liquid, a base 102, a cover 103, a heat dissipator 104, a manifold 105, a printed circuit board (PCB) 106, and a module case 107.

The plurality of liquid discharge heads 101 each includes a nozzle plate 10 having a nozzle 11, an individual channel plate 12 forming an individual chamber 13 in communication with the nozzle 11, a diaphragm 14 including a piezoelectric element 40 as a pressure generator, the supporting substrate 50 on the diaphragm 14, and a common channel member 70 on the supporting substrate 50.

The individual channel plate 12 forms, in addition to the individual chamber 13, a supply-side individual channel 15 in communication with the individual chamber 13 and a collection-side individual channel 16 in communication with the individual chamber 13.

The supporting substrate 50 forms a supply-side intermediate individual channel 51 in communication with the supply-side individual channel 15 through an opening 14*a* of the diaphragm 14 and a collection-side intermediate individual channel 52 in communication with the collection-side individual channel 16 through an opening 14*b* of the diaphragm 14.

The common channel member 70 forms a supply-side common channel 71 in communication with the supply-side intermediate individual channel 51 and a collection-side common channel 72 in communication with the collection-side intermediate individual channel 52. The supply-side common channel 71 is in communication with a supply port 81 through a channel 151 of the manifold 105. The collection-side common channel 72 is in communication with a collection port 82 through a channel 152 of the manifold 105.

The printed circuit board 106 and the piezoelectric element 40 of each liquid discharge head 101 are connected through a flexible wiring member 90 on which a driver integrated circuit (IC) (driving circuit) 91 is implemented.

In the present embodiment, the plurality of liquid discharge heads 101 spaced apart is attached to the base 102. For attachment of a liquid discharge head 101 to the base 102, the liquid discharge head 101 is inserted into an opening 121 with which the base 102 is provided, and the peripheral portion of the nozzle plate 10 of the liquid discharge head 101 is joined and secured to the cover 103 joined and secured to the base 102. A flange 70*a* provided outside the common channel member 70 of the liquid discharge head 101 is joined and secured to the base 102.

Note that securing a liquid discharge head 101 to the base 102 is not limited in structure, and thus a liquid discharge head 101 can be secured to the base 102 by bonding, caulking, or screwing.

The base 102 is preferably formed of a material having a low coefficient of linear expansion.

Examples of such a material include 42 alloy of iron to which nickel is added and invar material. In the present embodiment, the base 102 is formed of invar material. Thus, even when a rise is made in the temperature of the base 102 due to heat generation of each liquid discharge head 101, since the base 102 is small in the amount of expansion, nozzle deviation from a predetermined nozzle position hardly occurs, resulting in inhibition of deviation from a landing position.

The nozzle plate 10, the individual channel plate 12, and the diaphragm 14 are each formed of a silicon single crystal substrate substantially identical in the coefficient of linear expansion to the base 102.

Thus, deviation in nozzle position due to thermal expansion can be reduced.

Figure 16:
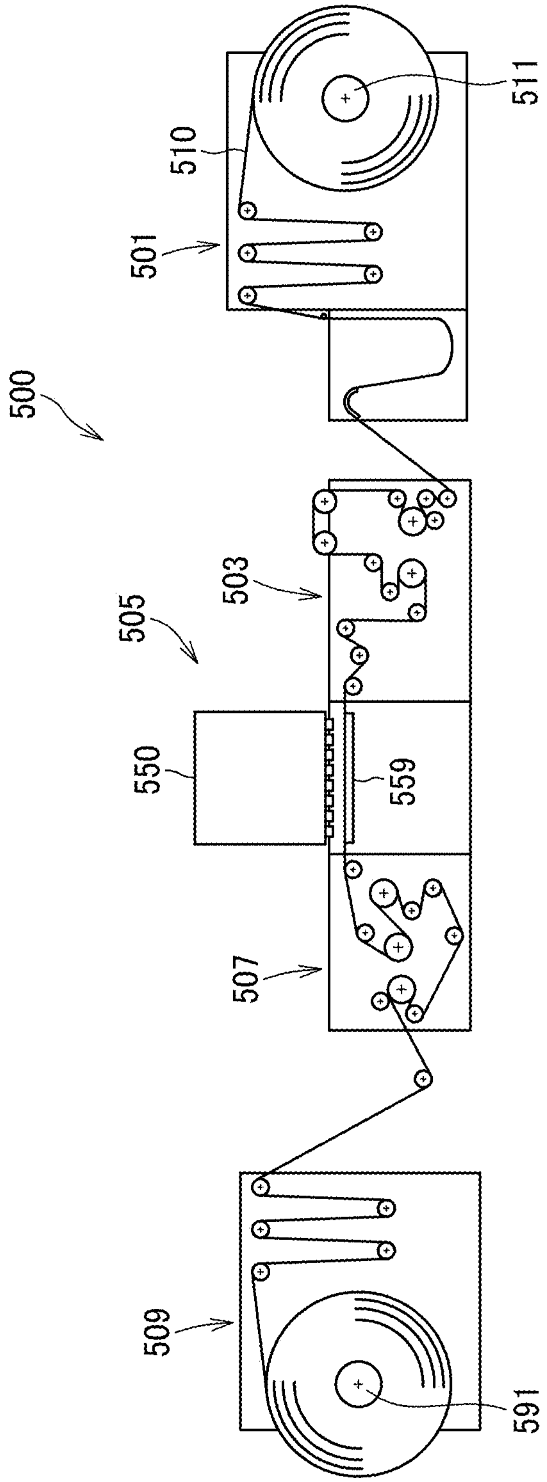
FIG. 16 illustrates a liquid discharge apparatus.
Figure 17:
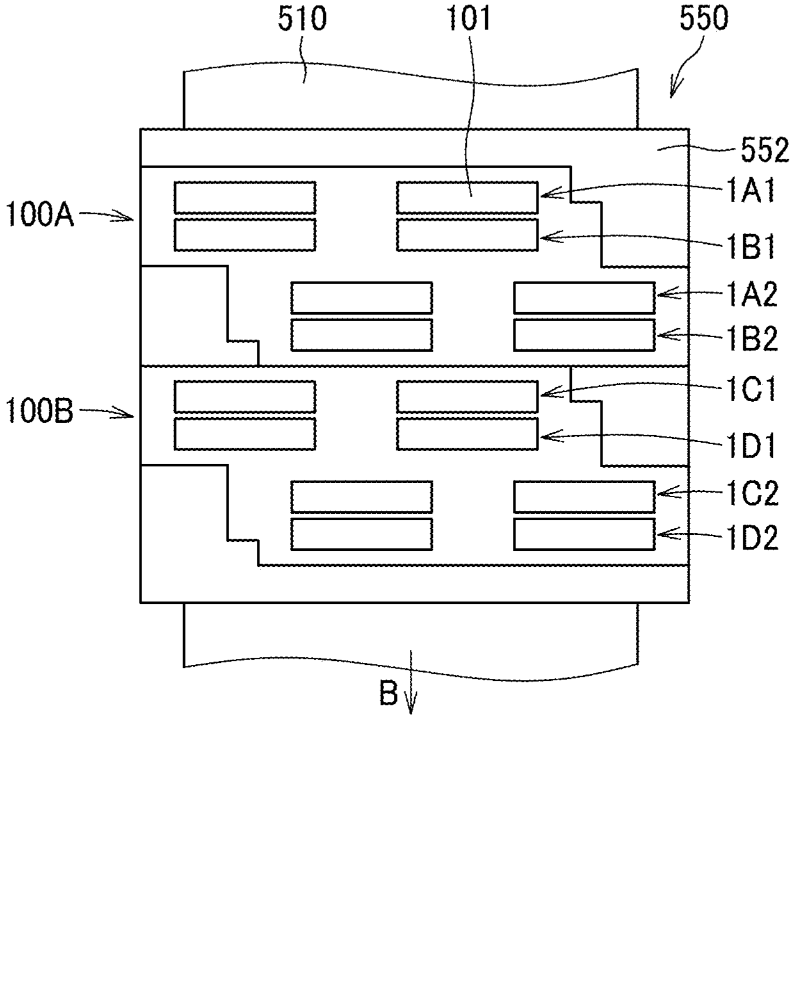
FIG. 17 is a plan view of an exemplary head unit.

Next, an exemplary liquid discharge apparatus according to the present embodiment will be described with reference to FIGS. 16 and 17. FIG. 16 is an explanatory schematic view of the liquid discharge apparatus. FIG. 17 is an explanatory plan view of an exemplary head unit in the liquid discharge apparatus.

A printing apparatus 500 as the liquid discharge apparatus includes a loader 501 that loads a continuous medium 510, a guide conveyer 503 that guide-conveys the continuous medium 510 loaded by the loader 501 to a printer 505, the printer 505 that discharges liquid to the continuous medium 510 to form an image as printing, a dryer 507 that dries the continuous medium 510, and an unloader 509 that unloads the continuous medium 510.

The continuous medium 510 fed from a winding roller 511 of the loader 501 is guide-conveyed by rollers in the loader 501, the guide conveyer 503, the dryer 507, and the unloader 509 and then is wound by a wind-up roller 591 of the unloader 509.

In the printer 505, the continuous medium 510 is conveyed on a conveyance guide 559 while facing a head unit 550, and an image is printed on the continuous medium 510 with liquid discharged from the head unit 550.

As illustrated in FIG. 17, the head unit 550 includes a common base 552 and two head modules 100A and 100B according to the present embodiment on the common base 552.

Then, the array direction of liquid discharge heads 101 of the head modules 100A and 100B orthogonal to the conveyance direction of the continuous medium 510 is defined as a head array direction. Respective Liquids to be discharged with a head array 1A1 and a head array 1A2 in the head module 100A are identical in color. Similarly, a head array 1B1 and a head array 1B2 in the head module 100A are set in order to discharge liquid in a desired color. A head array 1C1 and a head array 1C2 in the head module 100B are set in order to discharge liquid in a desired color. A head array 1D1 and a head array 1D2 in the head module 100B are set in order to discharge liquid in a desired color.

Embodiments of the present embodiment have been described above. However, the present embodiment is not limited to the embodiments described above, and thus various modifications can be made without departing from the gist of the present embodiment.

Herein, liquid to be discharged may have any viscosity or surface tension, provided that the liquid can be discharged from a head. Such liquid to be discharged is preferably, but is not particularly limited to, not more than 30 mPa·s in viscosity at normal temperature and normal pressure or due to heating or cooling. More specific examples of liquid to be discharged include a solution, a suspension, and an emulsion that contain a solvent, such as water or an organic solvent, a colorant, such as dye or pigment, a functional material, such as a polymerizable compound, resin, or a surfactant, a biocompatible material, such as deoxyribonucleic acid (DNA), an amino acid, protein, or calcium, or an edible material, such as a natural pigment. Such a solution, a suspension, and an emulsion can be used, for example, for inkjet inks, surface treatment liquids, liquids for formation of constituent elements in an electronic element or light-emitting element or for formation of a resist pattern for an electronic circuit, or material liquids for three-dimensional fabrication.

Examples of the "liquid" include ink, paint, pre-treatment liquid, binder, and overcoating liquid.

Herein, the "liquid discharge apparatus" includes a carriage including a liquid discharge head and drives the liquid discharge head to discharge liquid. Examples of such a liquid discharge apparatus include an apparatus that can discharge liquid to a recording medium to which the liquid can adhere and an apparatus that discharges liquid into gas or liquid.

The "liquid discharge apparatus" can include a feeder, a conveyer, and an ejector for a medium to which liquid can adhere, a pre-treatment device, and a post-treatment device.

Examples of the "liquid discharge apparatus" include an image forming apparatus that discharges ink to a sheet to form an image on the sheet and a three-dimensional fabrication apparatus that discharges fabrication liquid to a powder layer in which powder material is layered, in order to fabricate a three-dimensional fabrication object.

The "liquid discharge apparatus" is not limited to an apparatus that discharges liquid to visualize a meaningful image, such as a character or a figure. Examples of the "liquid discharge apparatus" include an apparatus that forms a meaningless pattern and an apparatus that fabricates a meaningless three-dimensional image.

The "medium to which liquid can adhere" described above corresponds to a medium to which liquid can adhere at least temporarily, such as a medium to which liquid fastens after adhering to or a medium into which liquid permeates after adhering to. Specific examples of the medium to which liquid can adhere include recording media, such as a sheet, recording paper, a recording sheet, a film, and cloth, electronic components, such as an electronic substrate and a piezoelectric element, and media, such as a powder layer, an organ model, and a testing cell. Unless otherwise particularly limited, any media to which liquid adheres are included.

The material of the "medium to which liquid can adhere" described above may be any material to which liquid can adhere even temporarily, such as paper, thread, fiber, fabric, leather, metal, plastic, glass, wood, or ceramic.

The "liquid discharge apparatus" may be, but is not limited to, an apparatus in which a liquid discharge head and a medium to which liquid can adhere move relatively. Specific examples of such an apparatus include a serial head apparatus that moves a liquid discharge head and a line head apparatus that does not move a liquid discharge head.

Examples of the "liquid discharge apparatus" further include a treatment-liquid coating apparatus that discharges, for the purpose of reforming the surface of a sheet, treatment liquid to the surface of a sheet to coat the treatment liquid on the surface of the sheet, and a jet granulation apparatus that jets, through a nozzle, a composition liquid including row material dispersed in a solution to granulate fine particles of the row material.

The present embodiment is directed to ensuring the strength of a damper member.

Note that the terms "image forming", "recording", "printing", "image printing", "print", and "fabricating" used herein are synonymous with each other.

Aspects of the present embodiment are, for example, as follows:

Aspect 1

According to Aspect 1, a liquid discharge head includes:
- a nozzle through which liquid is to be discharged;
- an individual chamber in communication with the nozzle;
- a pressure generator configured to generate pressure in the individual chamber; and
- a damper member including: a damper having flexibility; and a damper frame that damper frames the damper, in which the damper frame has:
- a damper region provided with a cavity facing the damper;
- a through hole on one side in a longitudinal direction of the damper member with respect to the damper region and another through hole on another side in the longitudinal direction of the damper member with respect to the damper region, the through hole and the another through hole being each in communication with an outside of the damper member;
- a first communication path in communication with the through hole and another first communication path in communication with the another through hole, the first communication path and said another first communication path being each in communication with an outer circumferential end of the damper member; and
- a second communication path having a portion in communication with the through hole and another portion in communication with the cavity and another second communication path having a portion in communication with the another through hole and another portion in communication with the cavity, and
- a straight line on which at least part of the first communication path in communication with the through hole is disposed is not identical to a straight line on which at least part of said another first communication path in communication with the another through hole is disposed.

Aspect 2

According to Aspect 2, a liquid discharge head includes:
a nozzle through which liquid is to be discharged;
an individual chamber in communication with the nozzle;
a pressure generator configured to generate pressure in the individual chamber; and
a damper member including: a damper having flexibility; and a damper frame that damper frames the damper,
in which the damper frame has:
a damper region provided with a cavity facing the damper;
a through hole outside the damper region, the through hole being in communication with an outside of the damper member;
a first communication path in communication with the through hole, the first communication path being in communication with an outer circumferential end of the damper member; and
a second communication path having a portion in communication with the through hole and another portion in communication with the cavity, and
a straight line on which at least part of the first communication path is disposed is not identical to a straight line on which the portion in communication with the through hole of the second communication path is disposed.

Aspect 3

According to Aspect 3, a liquid discharge head includes:
a nozzle through which liquid is to be discharged;
an individual chamber in communication with the nozzle;
a pressure generator configured to generate pressure in the individual chamber; and
a damper member including: a damper having flexibility; and a damper frame that damper frames the damper,
in which the damper frame has:
a damper region provided with a cavity facing the damper;
a through hole outside the damper region, the through hole being in communication with an outside of the damper member;
a second communication path having a portion in communication with the through hole and another portion in communication with a cavity of the plurality of cavities; and
a third communication path connecting the plurality of cavities, and
a straight line on which said another portion in communication with the cavity of the plurality of cavities of the second communication path is disposed is not identical to a straight line on which at least part of the third communication path is disposed.

Aspect 4

According to Aspect 4, a liquid discharge head includes:
a nozzle through which liquid is to be discharged;
an individual chamber in communication with the nozzle;
a pressure generator configured to generate pressure in the individual chamber; and
a damper member including: a damper having flexibility; and a damper frame that damper frames the damper,
in which the damper frame has:
a damper region provided with a plurality of cavities facing the damper; and
a plurality of third communication paths connecting the plurality of cavities, the plurality of third communication paths being each in communication with an outside of the damper member through a different communication path, and
a straight line on which at least part of the plurality of third communication paths is disposed is not identical to a straight line on which remaining part of the plurality of third communication paths is disposed.

Aspect 5

According to Aspect 5, in the liquid discharge head of Aspect 1,
the through hole on the one side is located closer to an end that the damper member has on the one side in the longitudinal direction with respect to the damper region, and
the another through hole on said another side is located closer to an end that the damper member has on said another side in the longitudinal direction with respect to the damper region.

Aspect 6

According to Aspect 6, in the liquid discharge head of Aspect 1,
the damper frame further has a third communication path,
the cavity with which the damper region is provided includes a plurality of cavities connected through the third communication path, and
the straight line on which the at least part of the first communication path is disposed, the straight line on which the at least part of said another first communication path is disposed, a straight line on which at least part of the second communication path and said another second communication path is disposed, and a straight line on which at least part of the third communication path is disposed are not identical.

Aspect 7

According to Aspect 7, a head module includes a plurality of liquid discharge heads each including the liquid discharge head of any of Aspects 1 to 6.

Aspect 8

According to Aspect 8, a head unit includes a plurality of head modules each including the head module of Aspect 7.

Aspect 9

According to Aspect 9, a liquid discharge apparatus includes the liquid discharge head of any of Aspects 1 to 6.

Aspect 10

A liquid discharge head includes: a nozzle through which a liquid is to be discharged; an individual chamber in communication with the nozzle; a pressure generator to generate pressure in the individual chamber; and a damper member including: a damper having flexibility; and a damper frame supporting the damper, the damper frame having: a damper region having a cavity facing the damper; a through hole at one side of the damper region in a longitudinal direction of the damper member; a first communication path connecting the through hole and one circumferential end of the damper member in the longitudinal direction; and a second communication path connecting the through hole and one side of the cavity of the damper region in the longitudinal direction, the second communication path is shifted from the first communication path in a transverse direction orthogonal to the longitudinal direction.

Aspect 11

In the liquid discharge head according to aspect 10, the damper frame has: a second through hole at another side of the damper region in the longitudinal direction; another first communication path connecting the second through hole and another circumferential end opposite to the one circumferential end of the damper member in the longitudinal direction; and another second communication path connecting the second through hole and another side of the cavity of the damper region in the longitudinal direction, said another second communication path is shifted from said another first communication path in the transverse direction.

Aspect 12

In the liquid discharge head according to aspect 11, the first communication path is shifted from said another first communication path in the transverse direction.

Aspect 12

In the liquid discharge head according to aspect 11, wherein the second communication path is shifted from said another second communication path in the transverse direction.

Aspect 13

A liquid discharge head includes: a nozzle through which a liquid is to be discharged; an individual chamber in communication with the nozzle; a pressure generator to generate pressure in the individual chamber; and a damper member including: a damper having flexibility; and a damper frame supporting the damper, the damper frame having: a damper region having multiple cavities facing the damper; a through hole at one side of the damper region in a longitudinal direction of the damper member; a first communication path connecting the through hole and one circumferential end of the damper member in the longitudinal direction; a second communication path connecting the through hole and one side of the cavity of the damper region in the longitudinal direction; and a third communication path serially connecting each of the multiple cavities in the longitudinal direction, the third communication path is shifted from the first communication path in a transverse direction orthogonal to the longitudinal direction.

Aspect 14

In the liquid discharge head according to aspect 13, the damper frame further has: a second through hole at another side of the damper region in the longitudinal direction; another first communication path connecting the second through hole and another circumferential end opposite to the one circumferential end of the damper member in the longitudinal direction; and another second communication path connecting the second through hole and another side of the cavity of the damper region in the longitudinal direction, and the third communication path is shifted from said another first communication path in the transverse direction.

Aspect 15

In the liquid discharge head according to aspect 14, the first communication path is shifted from said another first communication path in the transverse direction.

Aspect 16

In the liquid discharge head according to aspect 14, the second communication path is shifted from said another second communication path in the transverse direction.

Aspect 17

In the liquid discharge head according to aspect 14, the third communication path serially connecting each of a part of the multiple cavities in the longitudinal direction, the damper frame further has another third communication path serially connecting each of another part of the multiple cavities in the longitudinal direction, said another third communication path is shifted from the third communication path in the transverse direction.

Aspect 18

In the liquid discharge head according to aspect 13, the third communication path is shifted from the second communication path in the transverse direction.

Aspect 19

In the liquid discharge head according to aspect 15, the third communication path is shifted from each of the first communication path, said another first communication path, and the second communication path, in the transverse direction, and the second communication path is shifted from each of the first communication path and said another first communication path in the transverse direction.

Aspect 20

A head module includes multiple liquid discharge heads including the liquid discharge head according to aspect 13.

Aspect 21

A head unit includes multiple head modules each including the head module according to aspect 20.

Aspect 22

A liquid discharge apparatus includes the liquid discharge head according to aspect 13.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge head comprising:

a nozzle through which a liquid is to be discharged;

an individual chamber in communication with the nozzle;

a pressure generator to generate pressure in the individual chamber; and a damper member including:

a damper having flexibility; and a damper frame supporting the damper, the damper frame having:

a damper region having a cavity facing the damper;

a through hole at one side of the damper region in a longitudinal direction of the damper member;

a first communication path connecting the through hole and one circumferential end of the damper member in the longitudinal direction; and a second communication path connecting the through hole and one side of the cavity of the damper region in the longitudinal direction, the second communication path is shifted from the first communication path in a transverse direction orthogonal to the longitudinal direction, wherein the damper frame includes:

a second through hole at another side of the damper region in the longitudinal direction;

another first communication path connecting the second through hole and another circumferential end opposite to the one circumferential end of the damper member in the longitudinal direction; and another second communication path connecting the second through hole and another side of the cavity of the damper region in the longitudinal direction, said another second communication path is shifted from said another first communication path in the transverse direction.

2. The liquid discharge head according to claim 1, wherein;

the first communication path is shifted from said another first communication path in the transverse direction.

3. The liquid discharge head according to claim 1, wherein;

the second communication path is shifted from said another second communication path in the transverse direction.

4. A liquid discharge head comprising:

a nozzle through which a liquid is to be discharged;

an individual chamber in communication with the nozzle;

a pressure generator to generate pressure in the individual chamber; and a damper member including:

a damper having flexibility; and a damper frame supporting the damper, the damper frame having including:

a damper region having multiple cavities facing the damper;

a through hole at one side of the damper region in a longitudinal direction of the damper member;

a first communication path connecting the through hole and one circumferential end of the damper member in the longitudinal direction;

a second communication path connecting the through hole and one side of the multiple cavities of the damper region in the longitudinal direction; and a third communication path serially connecting each of the multiple cavities in the longitudinal direction, the third communication path is shifted from the first communication path in a transverse direction orthogonal to the longitudinal direction.

5. The liquid discharge head according to claim 4, wherein the damper frame further includes:

a second through hole at another side of the damper region in the longitudinal direction;

another first communication path connecting the second through hole and another circumferential end opposite to the one circumferential end of the damper member in the longitudinal direction; and another second communication path connecting the second through hole and another side of the multiple cavities of the damper region in the longitudinal direction, and wherein the third communication path is shifted from said another first communication path in the transverse direction.

6. The liquid discharge head according to claim 5, wherein:

the first communication path is shifted from said another first communication path in the transverse direction.

7. The liquid discharge head according to claim 5, wherein;

the second communication path is shifted from said another second communication path in the transverse direction.

8. The liquid discharge head according to claim 5, wherein:

the third communication path serially connects each of a part of the multiple cavities in the longitudinal direction, the damper frame further includes another third communication path serially connecting each of another part of the multiple cavities in the longitudinal direction, and said another third communication path is shifted from the third communication path in the transverse direction.

9. The liquid discharge head according to claim 4, wherein;

the third communication path is shifted from the second communication path in the transverse direction.

10. The liquid discharge head according to claim 6, wherein;

the third communication path is shifted from each of the first communication path, said another first communication path, and the second communication path, in the transverse direction, and the second communication path is shifted from each of the first communication path and said another first communication path in the transverse direction.

11. A head module comprising multiple liquid discharge heads including the liquid discharge head according to claim 4.

12. A head unit comprising multiple head modules each including the head module according to claim 11.

13. A liquid discharge apparatus comprising the liquid discharge head according to claim 4.

14. The liquid discharge head according to claim 1, wherein:

the second communication path includes a first communication portion in communication with the through hole, and a straight line on which the first communication path is disposed is different from a straight line on which the first communication portion is disposed.

15. The liquid discharge head according to claim 1, wherein:

the damper frame and the damper both include a Si-based material.

16. The liquid discharge head according to claim 1, wherein:

the damper frame includes a damper outer region between the damper region and the one circumferential end, and the through hole is located in a half of the damper outer region that is closer to the one circumferential end.

17. The liquid discharge head according to claim 1, wherein:

the one circumferential end of the damper member is a dicing line, and the first communication path connects the through hole to the dicing line.

18. The liquid discharge head according to claim 1, wherein:

the damper is a thin film that covers an entire face of the damper frame.

19. The liquid discharge head according to claim 1, wherein:

the through hole and the second through hole each have a circular cross-section.

* * * * *